United States Patent
Arai (10) Patent No.: US 8,412,430 B2
(45) Date of Patent: Apr. 2, 2013

(54) MULTIPLE CLUTCH TRANSMISSION CONTROL APPARATUS AND MULTIPLE CLUTCH TRANSMISSION CONTROL METHOD

(75) Inventor: Katsuhiro Arai, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 103 days.

(21) Appl. No.: 12/869,846

(22) Filed: Aug. 27, 2010

(65) Prior Publication Data

US 2011/0054752 A1    Mar. 3, 2011

(30) Foreign Application Priority Data

Aug. 28, 2009  (JP) ................. 2009-199012

(51) Int. Cl.
G06F 7/00  (2006.01)
G06F 17/00  (2006.01)
G06F 19/00  (2011.01)

(52) U.S. Cl. .......................................... 701/68; 701/67
(58) Field of Classification Search .............. 701/67, 701/68
See application file for complete search history.

(56) References Cited

U.S. PATENT DOCUMENTS

| | | | |
|---|---|---|---|
| 3,582,929 A | | 6/1971 | Dollase |
| 5,030,179 A | * | 7/1991 | Ganoung ......................... 475/50 |
| 6,341,680 B1 | * | 1/2002 | Ota et al. ....................... 192/3.55 |
| 7,351,185 B2 | * | 4/2008 | Kobayashi et al. ............ 477/111 |
| 7,470,213 B2 | * | 12/2008 | Matsudaira et al. ........... 477/120 |
| 7,607,367 B2 | * | 10/2009 | Mitsubori et al. ............... 74/335 |
| 7,694,792 B2 | * | 4/2010 | Tsukada et al. ............. 192/48.91 |
| 8,162,113 B2 | * | 4/2012 | Nakagawara et al. ........ 192/3.58 |
| 2005/0167232 A1 | * | 8/2005 | Kosugi et al. ................ 192/85 R |
| 2007/0284179 A1 | * | 12/2007 | Laeuffer ........................ 180/380 |
| 2008/0064551 A1 | * | 3/2008 | Laeuffer et al. .................. 475/5 |
| 2009/0143949 A1 | * | 6/2009 | Fukaya et al. .................. 701/67 |

FOREIGN PATENT DOCUMENTS

| | | |
|---|---|---|
| EP | 0 411 558 A1 | 2/1991 |
| EP | 1 450 074 A2 | 8/2004 |
| EP | 1 467 128 A1 | 10/2004 |
| EP | 2 042 781 A1 | 4/2009 |
| JP | 2004-251456 A | 9/2004 |
| JP | 2004-308841 A | 11/2004 |

OTHER PUBLICATIONS

Official Communication issued in corresponding European Patent Application No. 10174293.0, mailed on Oct. 27, 2010.

* cited by examiner

*Primary Examiner* — Jeffrey Shapiro
(74) *Attorney, Agent, or Firm* — Keating & Bennett, LLP (57) ABSTRACT

A multiple clutch transmission control apparatus performs gear changing smoothly by improving clutch torque control precision, without reducing the speed of gear changing, in a vehicle or the like including a multiple clutch transmission. With this control apparatus, a control unit switches the transmission gear from the previous gear to the next gear by changing the torque transfer path by controlling the first clutch and the second clutch in a clutch changeover period. In the clutch changeover period, the control unit changes the torque transfer path by raising the clutch torque capacity of whichever of the first clutch and the second clutch is the next-gear-side clutch to reach a target value, and then lowering the clutch torque capacity of the previous-gear-side clutch.

5 Claims, 7 Drawing Sheets

MULTIPLE CLUTCH TRANSMISSION CONTROL APPARATUS AND MULTIPLE CLUTCH TRANSMISSION CONTROL METHOD

CROSS REFERENCE TO RELATED APPLICATIONS

This application claims the benefit of Japanese Patent Application No. 2009-199012, filed on Aug. 28, 2009, the disclosure of which including the specification, drawings and abstract, is incorporated herein by reference in its entirety.

BACKGROUND OF THE INVENTION

1. Field of the Invention

The present invention relates to a control apparatus of a multiple clutch transmission including a plurality of clutches, and a multiple clutch transmission control method.

2. Description of the Related Art

Heretofore, a multiple clutch transmission (hereinafter also referred to simply as "transmission") that is mounted in an automobile and is equipped with a plurality of clutches in order to make possible speedy transmission operations in the automobile, and a control apparatus that controls such a transmission (see Japanese Patent Application Laid-Open No. 2004-251456 and Japanese Patent Application Laid-Open No. 2004-308841, for example), have been known.

This transmission has a plurality of clutches installed between the engine and two input shafts and is capable of transferring or blocking the respective driving forces, and gear pairs divided into two systems (for example, odd-numbered transmission gears and even-numbered transmission gears) providing selective coupling by means of a shifter selection operation between the two input shafts and a transmission output shaft (hereinafter referred to simply as "output shaft").

With this transmission, while power is being transferred to a gear pair of a selected transmission gear group coupled to one clutch by engaging one clutch and selected by a shifter, a neutral state can be established in which the other clutch can be maintained in an engaged state and power is not transferred to a gear pair of a transmission gear group corresponding to the other clutch. That is to say, in a state in which both clutches are engaged, power transfer can be performed from an output shaft to a driving wheel via a gear pair of desired transmission gears selected by means of a shifter selection operation.

Also, at the time of gear changing, among the plurality of clutches, the other clutch relating to a drive system of a transmission gear group that is not performing power transfer is disengaged, and then a gear pair of a transfer system having an input shaft coupled to this other clutch is selected, and the target gear is entered, after which this other clutch is engaged while the other clutch performing power transfer is disengaged. That is to say, with a conventional multiple clutch transmission, when changing from a currently selected transmission gear (also referred to as "previous gear") to a target transmission gear (also referred to as "next gear"), changeover whereby, by means of a control apparatus, clutches are operated simultaneously so that a clutch that transfers power for the next transmission gear (next gear) is engaged while the clutch performing power transfer continues to be disengaged, is performed in a state in which gear pairs of both transfer systems are connected.

SUMMARY OF THE INVENTION

With conventional multiple clutch transmission control whereby changeover is performed by simultaneously operating a plurality of clutches as disclosed in Japanese Patent Application Laid-Open No. 2004-251456 and Japanese Patent Application Laid-Open No. 2004-308841, in order to avoid transmission shock (a change in vehicle speed, pitching, or the like) due to a changeover as much as possible, it is necessary for the total value of torque capacity of clutches operated simultaneously to be a target value, such as an engine torque value in a clutch element, at all times during clutch changeover.

In order to make the total value of torque capacity of clutches operated simultaneously to be a target value at all times, it is necessary to control precisely the timing of the operation of both clutches.

Also, there is individual variability in each of the plurality of clutches themselves and a drive system including a clutch actuator that operates each clutch and the like, and furthermore the installation locations of each clutch and the drive system of each clutch are different. Consequently, instantaneously operating a plurality of clutches symmetrically requires still more precise control of each clutch and the drive system of each clutch.

When clutch transfer torque is controlled by performing a changeover by instantaneously operating a plurality of clutches simultaneously when changing gear in this way, it is also necessary for each clutch to be assembled with precision and for a gear pair or the like to which power is transferred by a clutch to be formed precisely, with a resultant problem of increased manufacturing cost of the transmission itself and a control apparatus that controls it, together with an increase in weight.

When a multiple clutch transmission is mounted on a motor cycle, in particular, since a motor cycle is lighter than an automobile and there is also limited space for control apparatus installation, precise control is difficult, and transmission shock that makes smooth gear changing difficult may occur even if the above-described configuration is used.

Therefore, preferred embodiments of the present invention provide a multiple clutch transmission control apparatus and multiple clutch transmission control method that enable gear changing to be performed smoothly by improving torque control precision of clutches, without reducing the speed of gear changing, in a vehicle or the like including a multiple clutch transmission.

According to a preferred embodiment of the present invention, a multiple clutch transmission control apparatus includes a first main shaft including odd-numbered transmission gears, a first clutch arranged to transfer or block engine torque to the first main shaft, a second main shaft including even-numbered transmission gears, a second clutch arranged to transfer or block the engine torque to the second main shaft, an output shaft including driven gears arranged to mesh with the odd-numbered transmission gears and the even-numbered transmission gears, and to transfer rotation from the first main shaft or the second main shaft to a driving wheel, and a transmission control section arranged to switch from a previous gear to a next gear by changing a torque transfer path by controlling the first clutch and the second clutch in a clutch changeover period, wherein in the clutch changeover period the transmission control section is arranged to change the torque transfer path by increasing a clutch torque capacity of a next-gear-side clutch from among the first clutch and the second clutch to a target value, and then decreasing clutch torque capacity of a previous-gear-side clutch.

According to another preferred embodiment of the present invention, a method for controlling a multiple clutch transmission including a first main shaft including odd-numbered transmission gears, a first clutch arranged to transfer or block engine torque to the first main shaft, a second main shaft including even-numbered transmission gears, a second clutch arranged to transfer or block the engine torque to the second main shaft, and an output shaft including driven gears arranged to mesh with the odd-numbered transmission gears and the even-numbered transmission gears, and to transfer rotation from the first main shaft or the second main shaft to a driving wheel, the method including the steps of controlling changing of gears such that switching is performed from a previous gear to a next gear by changing a torque transfer path by controlling the first clutch and the second clutch in a clutch changeover period, and changing the engine torque transfer path in the clutch changeover period by increasing clutch torque capacity of a next-gear-side clutch from among the first clutch and the second clutch to a target value, and then decreasing clutch torque capacity of a previous-gear-side clutch.

According to various preferred embodiments of the present invention, gear changing can be performed smoothly by improving clutch torque control precision, without reducing the speed of gear changing, in a vehicle or the like including a multiple clutch transmission.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A multiple clutch transmission control apparatus according to a preferred embodiment of the present invention performs gear switching appropriately by controlling a multiple clutch transmission having a plurality of clutches. In this preferred embodiment, a vehicle on which a control apparatus and a multiple clutch transmission controlled thereby are mounted is described as a motor cycle, but this is not a limitation, and a control apparatus and a multiple clutch transmission controlled thereby may also be mounted on a 3-wheeled vehicle or 4-wheeled vehicle such as an automobile or other suitable vehicles. Also, a multiple clutch transmission may be a semi-automatic transmission whereby decisions on clutch operation when starting and shift change timing are left to the driver/driver, and other control is automated, or may be a fully-automatic transmission.

First, an overview of a multiple clutch transmission controlled by a multiple clutch transmission control apparatus according to a preferred embodiment of the present invention will be given using FIG. 1.

Figure 1:
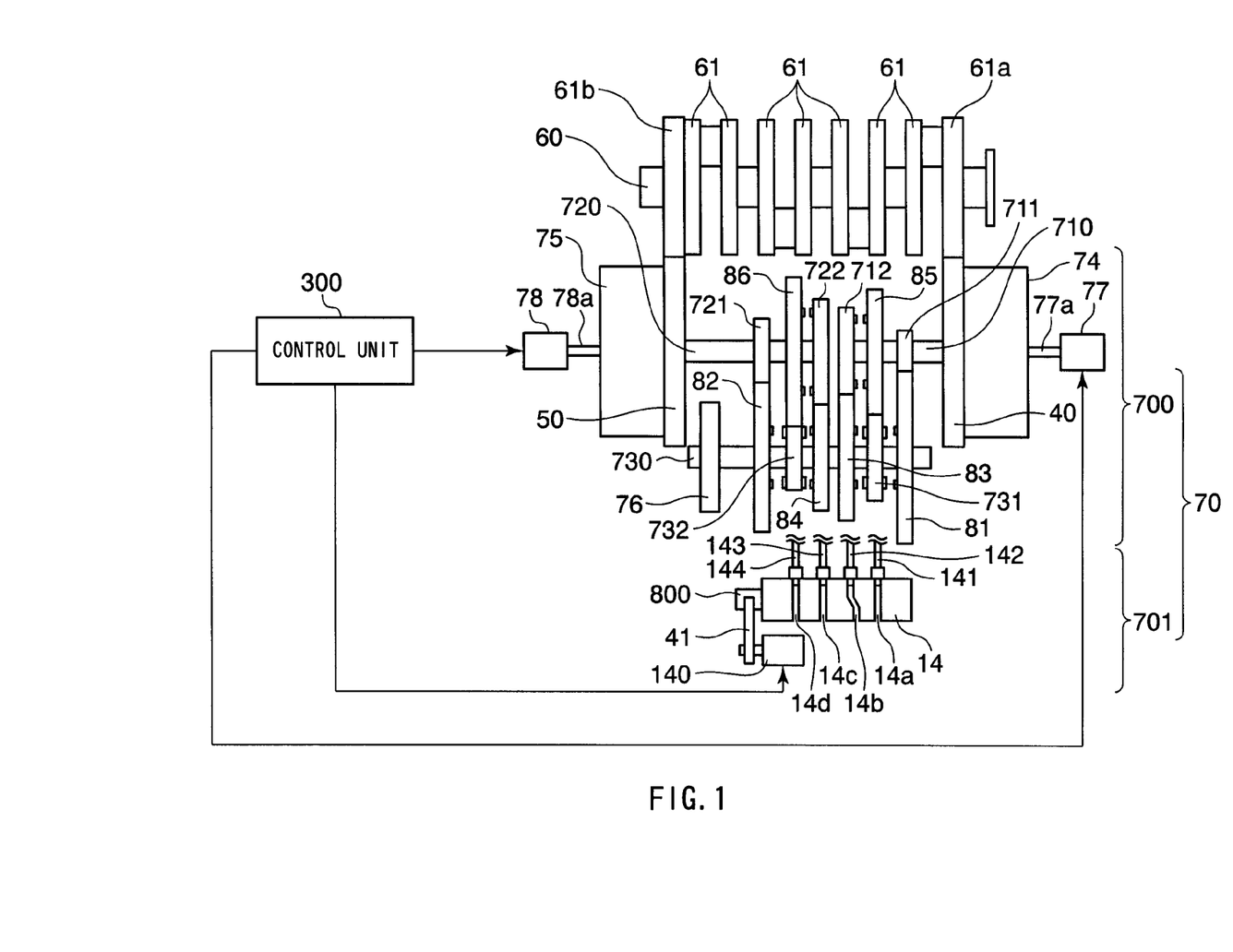
FIG. 1 is a schematic diagram showing a principal-portion configuration of a multiple clutch transmission controlled by a multiple clutch transmission control apparatus according to one preferred embodiment of the present invention.

FIG. 1 is a schematic diagram showing a principal-portion configuration of multiple clutch transmission 70 controlled by a multiple clutch transmission control apparatus according to one preferred embodiment of the present invention.

Multiple clutch transmission (hereinafter referred to as "transmission") 70 shown in FIG. 1 preferably is a DCT (Dual Clutch Transmission), and can transfer driving force to odd-numbered or even-numbered transmission gears by switching alternately between a plurality of clutches (first clutch 74 and second clutch 75).

As shown in FIG. 1, transmission 70 includes a transmission mechanism 700 that is connected to engine crankshaft 60 and varies torque transferred from crankshaft 60 and transfers it to the rear wheel side (not shown), and a shift mechanism 701 that performs varying operations in transmission mechanism 700. In a motor cycle, a transfer section 60 is arranged to extend in a direction perpendicular or substantially perpendicular to the front-back direction of the vehicle, and approximately horizontally (in a lateral direction).

Crankshaft 60 includes a plurality of crank webs 61, and of these plurality of crank webs 61, crank webs 61a and 61b located at one end and the other end of crankshaft 60 are external gears on which gear grooves on the outer periphery are provided.

Crank web 61a meshes with first primary driven gear (also referred to as "first input gear") 40 in first clutch 74. Through this meshing, power transferred to first input gear 40 from crank web 61a at one end of crankshaft 60 is transferred to first main shaft 710 of transmission 70 from one end of crankshaft 60 via first clutch 74.

Also, crank web 61b meshes with second primary driven gear (also referred to as "second input gear") 50 in second clutch 75. Through this meshing, power transferred to second input gear 50 from crank web 61b at the other end of crankshaft 60 is transferred to second main shaft 720 from the other end of crankshaft 60.

Transmission mechanism 700 includes, arranged parallel or substantially parallel to crankshaft 60, first main shaft (first main shaft section) 710, second main shaft (second main shaft section) 720, drive shaft (output shaft) 730, first clutch 74, second clutch 75, gears 81 through 86, 711, 712, 721, 722, 731, and 732 that perform power transfer between shafts 710 through 730, drive sprocket (hereinafter referred to as "sprocket") 76, and first and second clutch actuators 77 and 78.

In transmission mechanism 700, power transferred to first and second main shafts 710 and 720 is transferred to drive shaft 730 located at the rear of the vehicle by selecting gears 81 through 86, 711, 712, 721, 722, 731 and 732 as appropriate. Sprocket 76 is fixed to one end (the left end) of drive shaft 730. A drive chain is wound around a gear provided on a rotating shaft of the rear wheel (not shown). Driving force from transmission 70 is transferred to the rear wheel, which is the driving wheel, via a drive chain through the rotation of sprocket 76 due to the rotation of drive shaft 730. In other words, torque generated by the engine is output from drive shaft 730 via first clutch 74 or second clutch 75 and a predetermined gear train corresponding to the relevant transmission gear, and rotates the rear wheel (driving wheel).

The transmitting portion of driving force output to drive shaft 730 via odd-numbered gears (gears 81, 83, 85, 711, 712, and 731) on first main shaft 710, and the transmitting portion of driving force output to drive shaft 730 via even-numbered gears (gears 82, 84, 86, 721, 722, and 732) on second main shaft 720, have approximately the same outer diameter. Also, the driving force transmitting portion in first main shaft 710 and the driving force transmitting portion in second main shaft 720 are arranged so as not to overlap concentrically. In this transmission mechanism 700, first main shaft 710 and second main shaft 720 having the same outer diameter are arranged side by side laterally on the same axis line, and rotate independently of each other.

First main shaft 710 is coupled to first clutch 74, and second main shaft 720 is coupled to second clutch 75.

Transmission gears 711, 85, and 712 defining odd-numbered gears are disposed on first main shaft 710. Specifically, the following gears are arranged on first main shaft 710 in order from the base end to which first clutch 74 is connected: fixed gear (also referred to as "first-equivalent gear") 711, fifth gear 85, and spline gear (also referred to as "third-equivalent gear") 712.

Fixed gear 711 is preferably integral with first main shaft 710, and rotates together with first main shaft 710. Fixed gear 711 meshes with first gear (driven gear) 81 of drive shaft 730, and is also referred to herein as "first-equivalent gear."

Fifth gear 85 is attached to first main shaft 710, so as to be rotatable about the axis of first main shaft 710 and with its movement regulated in the axial direction, at a position between and at a distance from first-gear fixed gear 711 and third-gear spline gear 712.

Fifth gear 85 meshes with spline gear (fifth-equivalent gear as a driven gear) 731 of drive shaft 730.

Spline gear 712 is attached to first main shaft 710 at the front end of first main shaft 710—that is, at the distant end from first clutch 74—so as to be movable in the axial direction, and rotates together with the rotation of first main shaft 710.

Specifically, spline gear 712 is attached to first main shaft 710, so as to be able to slide in the axial direction while its rotation is regulated, via splines arranged along the axial direction on the outer periphery of the front end of first main shaft 710, and meshes with third gear (driven gear) 83 of drive shaft 730. This spline gear 712 is coupled to shift fork 142, and moves on first main shaft 710 in the axial direction through movement of shift fork 142. Spline gear 712 is also referred to herein as "third-equivalent gear."

Spline gear 712 moves toward fifth gear 85 on first main shaft 710 and engages with fifth gear 85, and regulates rotation (idling) about the axis of fifth gear 85 on first main shaft 710. Through the engagement of spline gear 712 with fifth gear 85, fifth gear 85 is fixed to first main shaft 710, and is made integrally rotatable together with the rotation of first main shaft 710.

On the other hand, gears 721, 86, and 722 defining even-numbered gears are arranged on second main shaft 720. Specifically, the following gears are arranged on second main shaft 720 in order from the base end to which second clutch 75 is connected: fixed gear (second-equivalent gear) 721, sixth gear 86, and spline gear (fourth-equivalent gear) 722.

Fixed gear 721 is preferably integral with second main shaft 720, and rotates together with second main shaft 720. Fixed gear 721 meshes with second gear (driven gear) of drive shaft 730, and is also referred to here as "second-equivalent gear."

Sixth gear 86 is attached to second main shaft 720, so as to be rotatable about the axis of second main shaft 720 and with its movement regulated in the axial direction, at a position between and at a distance from second-gear fixed gear 721 and fourth-gear spline gear 722. This sixth gear 86 meshes with spline gear 732 (sixth-equivalent gear as a driven gear) of drive shaft 730.

Spline gear (fourth-equivalent gear) 722 is attached to second main shaft 720 at the front end of second main shaft 720—that is, at the distant end from second clutch 75—so as to be movable in the axial direction, and rotates together with the rotation of second main shaft 720.

Specifically, spline gear 722 is attached to second main shaft 720, so as to be able to slide in the axial direction while its rotation with respect to second main shaft 720 is regulated, via splines arranged along the axial direction on the outer periphery of the front end of second main shaft 720, and meshes with fourth gear (driven gear) 84 of drive shaft 730. This spline gear 722 is coupled to shift fork 143, and moves on second main shaft 720 in the axial direction through movement of shift fork 143.

Spline gear 722 moves toward sixth gear 86 on second main shaft 720 and engages with sixth gear 86, and regulates rotation (idling) about the axis of sixth gear on second main shaft 720. Through the engagement of spline gear 722 with sixth gear 86, sixth gear 86 is fixed to second main shaft 720, and is made integrally rotatable together with the rotation of second main shaft 720.

Meanwhile, the following gears are arranged on drive shaft 730 in order from the first clutch 74 side: first gear 81, spline gear (fifth-equivalent gear) 731, third gear 83, fourth gear 84, spline gear (sixth-equivalent gear) 732, second gear 82, and sprocket 76.

On drive shaft 730, first gear 81, third gear 83, fourth gear 84, and second gear 82 are arranged to be rotatable about drive shaft 730 in a state in which their movement in the axial direction of drive shaft 730 is inhibited.

Spline gear (fifth-equivalent gear) 731 is attached to drive shaft 730 so as to be able to slide in the axial direction while its rotation is regulated via spline engagement. That is to say, spline gear 731 is attached so as to be movable in a sliding direction with respect to drive shaft 730, and also rotates together with drive shaft 730. This spline gear 731 is coupled to shift fork 141, and moves on drive shaft 730 in the axial direction through the movement of shift fork 141.

Spline gear (sixth-equivalent gear) 732 is attached to drive shaft 730 so as to be able to slide in the axial direction while its rotation is regulated via spline engagement. That is to say, spline gear (sixth-equivalent gear) 732 is attached so as to be movable in a sliding direction with respect to drive shaft 730, and also rotates together with drive shaft 730. This spline gear 732 is coupled to shift fork 144, and moves on drive shaft 730 in the axial direction through the movement of shift fork 144.

Sprocket 76 is fixed to the end of drive shaft 730 located on the second clutch 75 side.

These spline gears 712, 722, 731, and 732 function as transmission gears, and also function as dog selectors. Specifically, mutually fitting concave and convex portions are located on mutually opposing surfaces of spline gears 712, 722, 731, and 732 and transmission gears adjacent in the axial direction, and both gears rotate integrally through the fitting together of the concave and convex sections.

Thus, spline gears 712, 722, 731, and 732 are coupled by a dog mechanism to respective transmission gears (first gear 81 through sixth gear 86) that are adjacent in the axial direction by being moved in the axial direction via coupled shift forks 141 through 144.

First clutch 74 and second clutch 75 are arranged separate from each other in a direction that is perpendicular or substantially perpendicular to the front-back direction of the vehicle (here, in a lateral direction) so as to sandwich first main shaft 710 and second main shaft 720 from either side of the vehicle.

First clutch 74 is provided between crankshaft 60 and first main shaft 710. First clutch 74 transfers rotation power from the engine to first main shaft 710 via crankshaft 60 in an engaged state, and blocks rotation power to first main shaft 710 in a disengaged state. Torque transferred to first main shaft 710 is output from drive shaft 730 via a desired gear pair among the odd-numbered gears (gears 81, 83, 85, 711, 712, and 731) (a pair from gears 711, 85, and 712 on first main shaft 710 and gears 81, 731, and 83 on drive shaft 730 corresponding to these gears). First clutch 74 preferably is a well-known multi-plate friction clutch.

First clutch 74 is coupled to first pullrod 77a of first clutch actuator 77 controlled by a transmission control unit (TCU 110 shown in FIG. 2) of the control unit. With first clutch 74, when first pullrod 77a is pulled in a direction in which first pullrod 77a is spaced from first clutch 74, a plurality of clutch plates and a plurality of friction plates are spaced from each other, and transfer of torque from first input gear 40 to first main shaft 710 is blocked—that is, power transfer to first main shaft 710 is blocked. On the other hand, when first pullrod 77a moves toward first clutch 74, a plurality of clutch plates and a plurality of friction plates come into close contact with each other, and transfer torque to first main shaft 710—that is, perform power transfer of odd-numbered gears including a group of odd-numbered gears (first gear 81, third gear 83, and fifth gear 85).

Second clutch 75 is provided between crankshaft 60 and second main shaft 720, and, like first clutch 74, preferably is a multi-plate friction clutch. Second clutch 75 transfers rotation power from the engine to second main shaft 720 via crankshaft 60 in an engaged state, and blocks rotation power to second main shaft 720 in a disengaged state. Torque transferred to second main shaft 720 is output from drive shaft 730 via a desired gear pair among the even-numbered gears (gears 82, 84, 86, 721, 722, and 732) (a pair from gears 721, 86, and 722 on second main shaft 720 and gears 82, 732, and 84 on drive shaft 730 corresponding to these gears).

Second clutch 75 preferably is a well-known multi-plate clutch like first clutch 74, and is coupled to second pullrod 78a of second clutch actuator 78 controlled by transmission control unit 110 of the control unit. With second clutch 75, when second pullrod 78a is pulled in a direction in which second pullrod 78a is spaced from second clutch 75, a plurality of clutch plates and a plurality of friction plates are spaced from each other, and transfer of torque from second input gear 50 to second main shaft 720 is blocked—that is, power transfer to second main shaft 720 is blocked. On the other hand, when second pullrod 78a moves toward second clutch 75, a plurality of clutch plates and a plurality of friction plates come into close contact with each other, and transfer torque to second main shaft 720—that is, perform power transfer of even-numbered gears including a group of odd-numbered gears (second gear 82, fourth gear 84, and sixth gear 86).

In this way, first clutch 74 and second clutch 75 are subjected to drive control by control unit 300 (to be precise, TCU 110 shown in FIG. 2), via first clutch actuator 77 and second clutch actuator 78.

Gear shifting performed for gears 81 through 86, 711, 712, 721, 722, 731, and 732 in transmission mechanism 700 is performed by shift forks 141 through 144 that are moved by the rotation of shift cam 14 in shift mechanism 701.

Shift mechanism 701 includes shift forks 141 through 144, shift cam drive unit 800 that provides rotational driving of shift cam 14, motor 140, and drive mechanism 41 that couples motor 140 to shift cam drive unit 800 and transfers the driving force of motor 140 to shift cam drive unit 800.

Shift forks 141 through 144 are installed between spline gears 731, 712, 722, and 732 and shift cam 14, and are arranged distant from each other in the axial direction of first and second main shafts 710 and 720, drive shaft 730, and shift cam 14. These shift forks 141 through 144 are arranged so as to be parallel or substantially parallel to each other, and are each movable in the axial direction of the rotation axis of shift cam 14.

Shift forks 141 through 144 include pin sections at the base end, arranged so as to be movable respectively within four cam grooves 14a through 14d provided in the outer periphery of shift cam 14. That is to say, shift forks 141 through 144 are follower members of shift cam 14, which is the driving source, and slide in the axial direction of first and second main shafts 710 and 720 and drive shaft 730 in accordance with the shape of cam grooves 14a through 14d of shift cam 14. As a result of this sliding movement, spline gears 731, 712, 722, and 732 coupled to the front end each move in the axial direction on shafts passing through the respective inner diameters.

Shift cam 14 is cylindrical, and is arranged so that its rotation axis is parallel or substantially parallel to first main shaft 710, second main shaft 720, and drive shaft 730.

Shift cam 14 is rotated by the driving force of motor 140 transferred to shift cam drive unit 800 via drive mechanism 41, and through this rotation, at least one of shift forks 141 through 144 is moved in the axial direction of the rotation axis of shift cam 14 in accordance with the shape of cam grooves 14a through 14d.

Through shift forks 141 through 144 that move in response to the rotation of shift cam 14 having cam grooves 14a through 14d, a spline gear coupled to a moved shift fork moves, and a gear shift of transmission 70 (transmission mechanism 700) is performed.

In transmission 70 configured in this way, engine driving force from crankshaft 60 is output via one of two independent systems including first main shaft 710 and second main shaft 720, and via drive shaft 730, through the operation of first clutch 74 and second clutch 75 and the operation of shift mechanism 701 corresponding thereto. Drive sprocket 76 rotates together with the rotation of drive shaft 730, and rotates the rear wheel via a chain.

Figure 2:
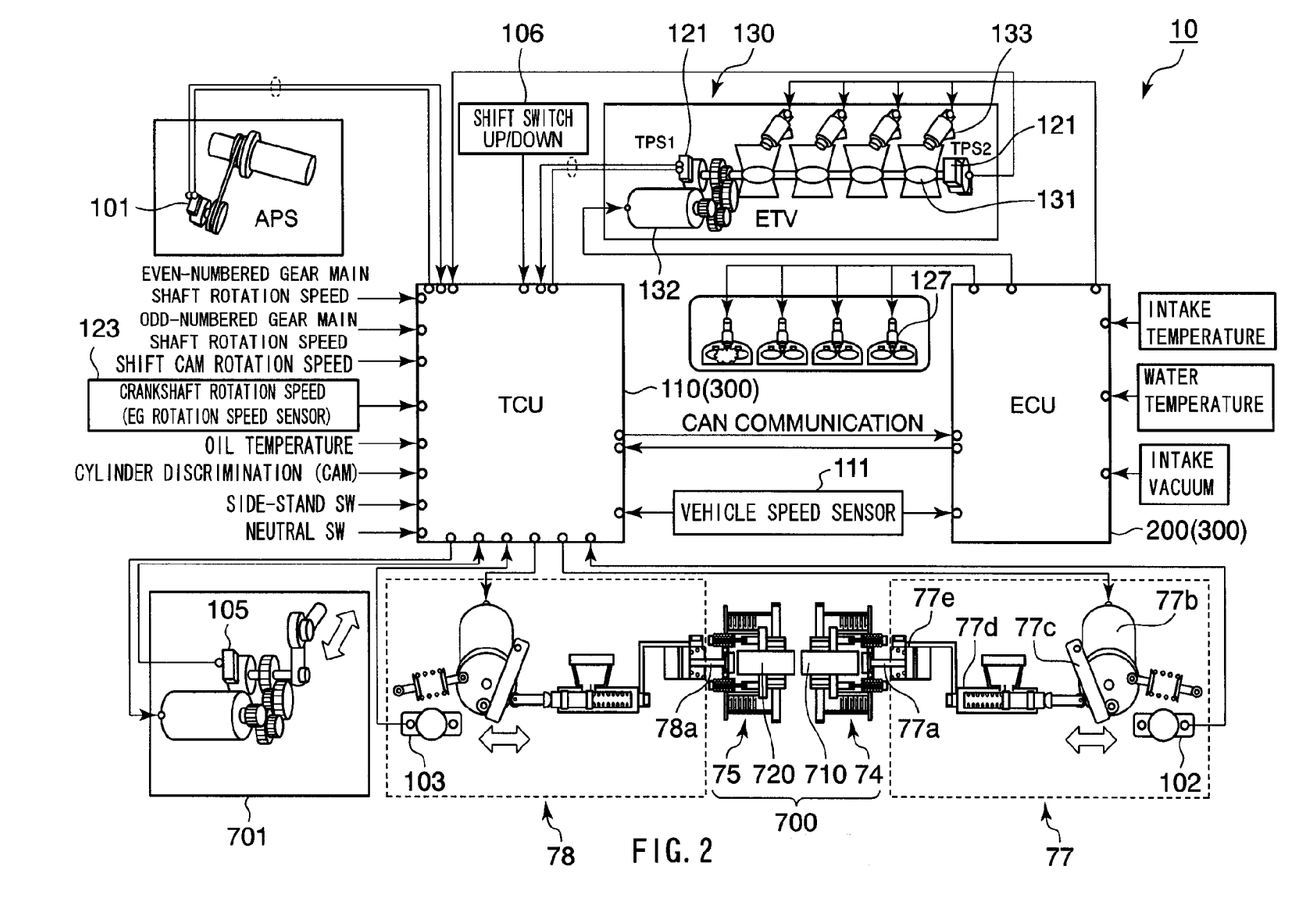
FIG. 2 is a schematic diagram showing a control system of a motor cycle equipped with a multiple clutch transmission control apparatus according to one preferred embodiment of the present invention.

Shift mechanism 701 that drives first clutch 74, second clutch 75, and shift forks 141 through 144 in this transmission 70 is controlled by control unit 300 in control system 10 (see FIG. 2).

FIG. 2 is a schematic diagram showing a control system of a motor cycle equipped with a multiple clutch transmission control apparatus according to one preferred embodiment of the present invention. The engine unit is omitted from FIG. 2.

In control system (control apparatus) 10 shown in FIG. 2, control unit 300 includes TCU (also referred to as "transmission control unit") 110 and ECU (also referred to as "engine control unit") 200, and information exchange of various kinds of data is performed between transmission control unit 110 and engine control unit 200 via data communication such as CAN communication.

In addition to transmission control unit 110 and engine control unit 200, control system 10 also includes accelerator position sensor 101, clutch angle sensors 102 and 103, shift position sensor (transmission gear detection section) 105, shift switch 106, first clutch actuator 77, second clutch actuator 78, shift mechanism 701, and output shaft rotation speed sensor (hereinafter referred to as "vehicle speed sensor") 111.

Accelerator position sensor 101 detects the driver's accelerator operation amount APS, and outputs this to transmission control unit 110.

Clutch angle sensors 102 and 103 detect the positions of the respective clutches—that is, the engagement state of first clutch 74 via first clutch actuator 77 and an engaged state of second clutch 75 via second clutch 75—and output these to transmission control unit 110. Specifically, based on the rotation angle of motor 77b, clutch angle sensor 102 outputs an amount of separation between the plurality of clutch plates and the plurality of friction plates adjusted by first pullrod 77a—that is, the engagement state in first clutch 74—to transmission control unit 110. Clutch angle sensor 103 preferably is also configured in the same way as, and has a similar function to, clutch angle sensor 102, and outputs the amount of separation between the plurality of clutch plates and the plurality of friction plates in second clutch 75 and the engagement state in second clutch 75, to transmission control unit 110.

Vehicle speed sensor (output shaft rotation speed sensor) 111 detects the rotation speed of drive shaft 730 of transmission 70 (drive shaft rotation speed: equivalent to vehicle speed), and outputs this to transmission control unit 110 and engine control unit 200.

Shift position sensor 105 detects a gear position (first through sixth or neutral) defining a predetermined gear through operation of motor 140 of shift mechanism 701, and outputs this to transmission control unit 110.

Shift switch 106 includes a shift-up button and shift-down button (not shown), and transmission 70 performs gear change operations by depression of these shift-up and shift-down buttons.

That is to say, when the driver presses the shift-up button or shift-down button of shift switch 106, a signal indicating that fact (hereinafter referred to as a "shift signal") is output from shift switch 106 to control unit 300. Based on the input shift signal, control unit 300 controls first and second clutch actuators 77 and 78 and motor 140. As a result of this control, either first clutch 74 or second clutch 75, or both first and second clutches 74 and 75, is/are disengaged, shift cam 14 rotates, and a transmission 70 (to be precise, transmission mechanism 700) gear shift is performed.

In this preferred embodiment, an up-shift operation is executed by transmission 70 when the shift-up button is pressed by the driver, and a shift-down operation is executed by transmission 70 when the shift-down button is pressed by the driver.

Based on a control command from transmission control unit 110, first clutch actuator 77 adjusts the engagement force acting on first main shaft 710 in first clutch 74—that is, the transfer torque from first clutch 74 to first main shaft 710. As a result, transfer or blocking of power from the engine to first main shaft 710 is performed, and the vehicle starts or stops.

First clutch actuator 77 of this preferred embodiment adjusts first clutch 74 transfer torque via hydraulic pressure. In first clutch actuator 77, motor 77b under drive control by transmission control unit 110 drives master cylinder 77d via link 77c, and sends hydraulic fluid to slave cylinder 77e.

Through the influx of hydraulic fluid, slave cylinder 77e moves first pullrod 77a energized toward the first clutch 74 side in a direction that distances first pullrod 77a from the first clutch 74 side. As a result, engagement force of first clutch 74—that is, transfer torque—is decreased, and power from the engine (to be precise, crankshaft 60) to first main shaft 710 is blocked. As a result of first pullrod 77a moving so as to be pulled in a direction in which first pullrod 77a is spaced from first clutch 74 in this way, first clutch 74 becomes disengaged. Also, through driving by motor 77b, the state in which first pullrod 77a is pulled in a direction in which first pullrod 77a is spaced from first clutch 74 is cleared, and first pullrod 77a moves toward first clutch 74. As a result, the engagement force of first clutch 74 is increased, and transfer torque from the engine to first main shaft 710 increases. At this time, first clutch 74 enters a state in which there is transfer torque from the engine to first main shaft 710—that is, an engaged state.

Based on a control command from transmission control unit 110, second clutch actuator 78 adjusts the engagement force acting on second main shaft 720 in second clutch 75—that is, the transfer torque from second clutch 75 to first main shaft 720. As a result, transfer or blocking of power from the engine to second main shaft 720 is performed, and the vehicle starts or stops.

Second clutch actuator 78 preferably is configured in a similar way to first clutch actuator 77, and drives second clutch 75 by the same kind of operation as that by which first clutch actuator 77 drives first clutch 74.

Furthermore, while the vehicle is moving, first clutch actuator 77 and second clutch actuator 78 perform gear change operations by switching the torque transfer path inside the transmission by operating first clutch 74 and second clutch 75.

Here, first clutch actuator 77 and second clutch actuator 78 have been assumed to be preferably hydraulic, but they may be of any configuration, including electrical, as long as that configuration adjusts the engagement force acting on a clutch.

Shift mechanism 701 is an apparatus that selects a gear. Based on a control command from transmission control unit 110, shift mechanism 701 selectively operates shift forks 141 through 144 mounted in the transmission (see FIG. 2), puts at least one of first main shaft 710 and second main shaft 720, which are the transmission input shafts, and drive shaft 730 in a coupled state, to define a predetermined transmission gear.

Throttle opening sensor 121 detects the opening of throttle valve 131 of electronically controlled throttle 130 and outputs a corresponding signal to transmission control unit 110.

Engine rotation speed sensor 123 detects engine rotation speed (specifically, the rotation speed of crankshaft 60) Ne, and outputs a corresponding signal to transmission control unit 110.

Throttle valve 131 opening from throttle opening sensor 121 and engine rotation speed Ne from engine rotation speed sensor 123 are input to engine control unit 200 from transmission control unit 110 via CAN communication together with a signal from accelerator position sensor 101 and so forth. That is to say, information input to transmission control unit 110 is input to engine control unit 200, and information input to engine control unit 200 is also input to transmission control unit 110 via CAN communication. Thus, transmission control unit 110 and engine control unit 200 share information input to each of them. Engine control unit 200 controls engine driving using the information input in this way.

Transmission control unit 110 and engine control unit 200 use the input information to control various sections of the vehicle.

Engine control unit 200 receives a required torque command that decides engine torque from transmission control unit 110, and controls engine torque.

Engine control unit 200 controls torque generated by the engine by varying the operation of electronically controlled throttle 130 or varying ignition timing using ignition 127 based on a received required torque command.

Engine control unit 200 is connected to electronically controlled throttle 130, engine injector 133, and ignition 127, and controls the engine using these connected sections. Information such as the intake temperature, water temperature, and intake vacuum, is input to engine control unit 200 from connected sensors.

Based on a control command from engine control unit 200, electronically controlled throttle 130 drives motor 132 and adjusts the opening of throttle valve 131 provided in the engine intake system.

Sensors provided on the motor cycle are connected to transmission control unit 110, and information such as the accelerator position, engine rotation speed, first main shaft 710 rotation speed (shown as "odd-numbered gear main shaft rotation speed" in FIG. 2), second main shaft 720 rotation speed (shown as "even-numbered gear main shaft rotation speed" in FIG. 2), shift cam 14 rotation angle, drive shaft 730 rotation speed, oil temperature, first clutch 74 position, second clutch 75 position, electromagnetic throttle valve position, and so forth, is input from these sensors. In addition, side-stand switch (side-stand SW) information from a side-stand switch (not shown) and neutral switch (neutral SW) information from a neutral switch are input to transmission control unit 110.

Also, based on input signals, transmission control unit 110 controls the operation of first clutch actuator 77, second clutch actuator 78, and shift mechanism 701 at predetermined timings. Through the operation of first clutch actuator 77, second clutch actuator 78, and shift mechanism 701 in this way, first clutch 74, second clutch 75, and transmission gears are operated, and transmission gear switching operations are performed.

Specifically, transmission control unit 110 receives a transmission gear command from shift switch 106, and calculates target engine torque and target clutch torque based on various input information (accelerator position, engine rotation speed, first main shaft 710 rotation speed, second main shaft 720 rotation speed, drive shaft 730 rotation speed, and shift cam rotation angle).

Furthermore, based on the target engine torque and target clutch torque, transmission control unit 110 calculates the target throttle opening, target shift cam 14 rotation angle, and target clutch angle for first clutch 74 or second clutch 75.

Using these calculation results, transmission control unit 110 controls the operation of first clutch actuator 77, second clutch actuator 78, and shift mechanism 701, and manipulates first the engagement-side clutch and then the release-side clutch to change the torque transfer path.

As transmission gear switching operations that change the torque transfer path, transmission control unit 110 performs an operation that releases the clutch currently transferring torque (the release-side clutch), and an operation that engages the clutch that will transfer torque next (the engagement-side clutch), these operations being performed sequentially, not simultaneously.

In other words, during a gear changing period, transmission control unit 110 operates the next-gear-side clutch that will transfer torque to the next-gear (target transmission gear) gear pair constituting the transmission gear after the change, and raises the clutch torque capacity of the next-gear-side clutch to the target value, and then operates the previous-gear-side clutch that transmits torque to the previous-gear gear pair constituting the transmission gear before the changeover, and lowers the clutch torque capacity of the previous-gear-side clutch. As a result, the torque transfer path in transmission 70 is changed.

Here, the gear changing period is a period during which the torque transfer path is changed by the operation of first clutch 74 or second clutch 75, and has a torque transfer preparation phase, a torque transfer path change phase, and an inertia phase.

The torque transfer preparation phase is a period in which a state is established in which a clutch changeover operation can be performed immediately in a phase after the torque transfer preparation phase, such as the torque transfer path change phase, for example. Specifically, in the torque transfer preparation phase, whichever of first clutch 74 and second clutch 75 to be the engagement-side clutch is put into a state in which torque capacity is generated immediately when an operation command is received. That is to say, in this torque transfer preparation phase, the engagement-side clutch is moved to a position of a state immediately before engagement (a state in which the plurality of clutch plates and the plurality of friction plates have been brought into close proximity immediately before coming into contact with each other). This clutch state is also referred to below as a state in which the clutch is in an engagement preparatory position.

With first and second clutch actuators 77 and 78 of this preferred embodiment, the torque transfer preparation phase can also be said to be a period in which the pullrod of the clutch actuator for the engagement-side clutch is stroked, and the engagement-side clutch is operated as far as the engagement preparatory position.

The torque transfer path change phase (also referred to as "torque phase") is a period in which clutches are actually operated—that is, the torque transfer path is changed by changing over the clutches—and is the actual gear changing period. In this preferred embodiment, in the torque transfer path change phase, transmission control unit 110 performs a sequential clutch changeover by controlling first clutch actuator 77 and second clutch actuator 78.

In the torque transfer path change phase, transmission control unit 110 first operates the engagement-side clutch and makes the engagement-side clutch torque capacity a target value, and then operates the release-side clutch and makes the release-side clutch torque capacity a target value.

In this preferred embodiment, the target value of clutch torque capacity in the engagement-side clutch is, for example, taken to be the amount of engine torque transferred to the clutch portion (the |Teg| amount), and the target value of the release-side clutch torque capacity is taken to be 0. That is to say, transmission control unit 110 first operates the engagement-side clutch and makes the engagement-side clutch torque capacity value the engine torque value from 0, and then operates the release-side clutch so that the release-side clutch torque capacity value becomes 0, and disengages the release-side clutch.

In this torque transfer path change phase, the total of the clutch torque capacity of the engagement-side clutch and the clutch torque capacity of the release-side clutch operated by transmission control unit 110 is greater than or equal to the engine torque amount (|Teg|), and is less than or equal to twice the engine torque amount (the |Teg| amount).

The inertia phase is a period in which correction of inertia accompanying a rotation speed change is executed while changing the input rotation speed to the proximity of the rotation speed to be implemented after a gear change. In other words, the inertia phase is a period in which, when changing gear, the engine rotation speed is made to match the rotation speed of the input shaft (first main shaft 710 or second main shaft 720) on the changed-to gear (next gear) side. If there is a difference between the engine rotation speed and the rotation speed of the changed-to input shaft, then |clutch transfer torque (actually transferred torque)|=clutch torque capacity (the maximum torque capacity that the clutch can transfer). If there is no difference between the engine rotation speed and the rotation speed of the changed-to input shaft, then |clutch transfer torque (actually transferred torque)|≦clutch torque capacity (the maximum torque capacity that the clutch can transfer). Here, in the inertia phase, in the case of quadrant 1 and quadrant 3, adjustment that adjusts the engine rotation speed with the engagement-side clutch is performed, and in the case of quadrant 2 and quadrant 4, adjustment that adjusts the engine rotation speed with the release-side clutch is performed.

In the inertia phase, for example, in the case of quadrant 1 and quadrant 3, after clutch changeover from the release side to the engagement side has been completed gear changing actually proceeds in the transmission transfer path, and the rotation speed of the input shaft (first main shaft 710 or second main shaft 720) is decreased. That is to say, in the inertia phase, transmission control unit 110 places the engagement-side clutch in an engaged state, and causes power to be transferred to drive shaft 730 via the engagement-side clutch. On the other hand, in this inertia phase the release-side clutch is disengaged by transmission control unit 110 in order to disconnect a dog that was performing gear changing before the gear change. In the inertia phase, the release-side clutch is engaged after the dog is disconnected and a neutral (idling) state has been entered.

A transmission gear switching operation including first clutch 74 and second clutch 75 operations performed in this way by transmission control unit 110 is performed by selecting a mode from among, for example, four transmission control modes (hereinafter also referred to as "control modes") according to a transmission command from the driver.

The four transmission control modes are modes corresponding to transmission patterns that perform respectively a down-shift during vehicle acceleration, an up-shift during acceleration, a down-shift during deceleration, and an up-shift during deceleration, for example.

In the gear changing period in each of these four transmission control modes, transmission control unit 110 controls the operation of first clutch 74 via first clutch actuator 77 and controls the operation of second clutch 75 via second clutch actuator 78 in performing transmission control. The gear changing period of each control mode includes a torque transfer preparation phase, torque transfer path change phase, and inertia phase, for example.

Figure 3:
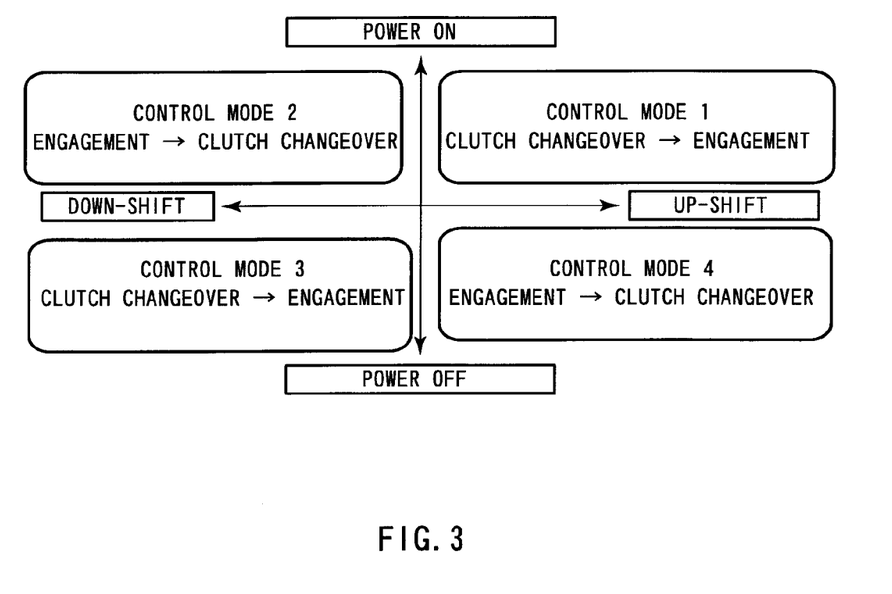
FIG. 3 is a drawing showing control mode quadrants constituting a control pattern when transmission control is performed.

FIG. 3 is a drawing showing control mode quadrants constituting a control pattern when transmission control is performed. In FIG. 3, "clutch changeover" indicates a clutch operation in the torque transfer path change phase, and "engagement" indicates an operation in the inertia phase, indicating a clutch engagement state in which power is transferred via the engagement-side clutch.

Control mode 1 indicated by the first quadrant in FIG. 3 is a positive engine torque (referred to as "power-on") state when engine torque is expressed as positive or negative, and is a state in which the transmission gear is raised (referred to as "up-shift state"). This is called a power-on up-shift state.

This power-on up-shift state is, for example, a state in which the transmission gear is raised during acceleration, such as by performing an up-shift from first gear to second gear while the vehicle is running. In the gear changing period of control mode 1 indicated by the first quadrant, phase transitions are made in the following order: torque transfer preparation phase, torque transfer path change phase, inertia phase.

Control mode 2 indicated by the second quadrant in FIG. 3 is a positive engine torque (referred to as "power-on") state when engine torque is expressed as positive or negative, and is a state in which the transmission gear is lowered (referred to as "down-shift state"). This state is entered via a so-called kick-down operation, and is called a power-on down-shift state.

This power-on down-shift state is, for example, a state in which the transmission gear is lowered and driving wheel torque is increased, and is a state in which the load on the driving wheel increases when climbing a hill, for instance. In the gear changing period of control mode 2 indicated by the second quadrant, the torque transfer path change phase and the inertia phase are switched around as compared with control mode 1 indicated by the first quadrant. That is to say, in the gear changing period of control mode 2 indicated by the second quadrant, phase transitions are made in the following order: torque transfer preparation phase, inertia phase, torque transfer path change phase.

Control mode 3 indicated by the third quadrant in FIG. 3 is a negative engine torque (referred to as "power-off") state when engine torque is expressed as positive or negative, and is a state in which the transmission gear is lowered (referred to as "down-shift state"). This is called a power-off down-shift state.

This power-off down-shift state is, for example, a state in which the transmission gear is lowered during deceleration, such as by performing a down-shift from second gear to first gear while the vehicle is running. In the gear changing period of control mode 3 indicated by the third quadrant, phase transitions are made in the following order: torque transfer preparation phase, torque transfer path change phase, inertia phase.

Control mode 4 indicated by the fourth quadrant in FIG. 3 is a negative engine torque (referred to as "power-off") state when engine torque is expressed as positive or negative, and is a state in which the transmission gear is raised (referred to as "up-shift state"). This is called a power-off up-shift state.

This power-off up-shift state is, for example, a state in which the vehicle accelerates due to a kick-down, speed increases, and the driver eases up on the accelerator, and is a state in which the load on the driving wheel decreases while the transmission gear continues to be raised.

In the gear changing period of control mode 4 indicated by the fourth quadrant, the torque transfer path change phase and the inertia phase are switched around as compared with control mode 3 indicated by the third quadrant. That is to say, in the gear changing period of control mode 4 indicated by the fourth quadrant, phase transitions are made in the following order: torque transfer preparation phase, inertia phase, torque transfer path change phase.

Transmission control in transmission 70 performed in control modes 1 through 4 in a motor cycle equipped with control system 10 configured in this way will now be described with reference to FIG. 4 through FIG. 7.

FIG. 4 through FIG. 7 are time charts showing torque variation and rotation speed variation corresponding to clutch operation controlled in the control modes of the first quadrant through fourth quadrant in FIG. 3.

Figure 4:
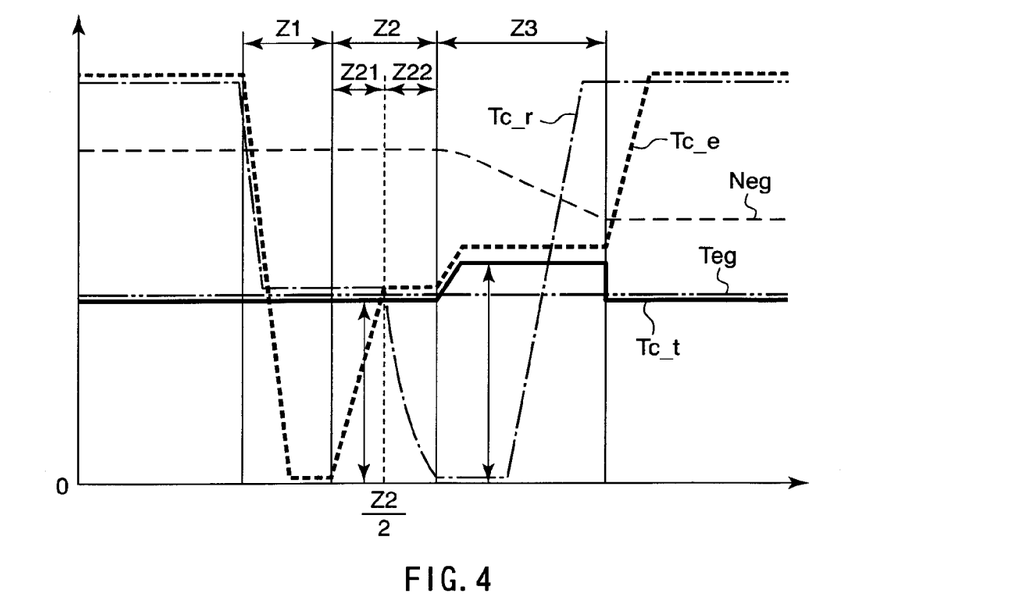
FIG. 4 is a time chart showing torque variation and rotation speed variation corresponding to clutch operation when a power-on up-shift is performed.
Figure 5:
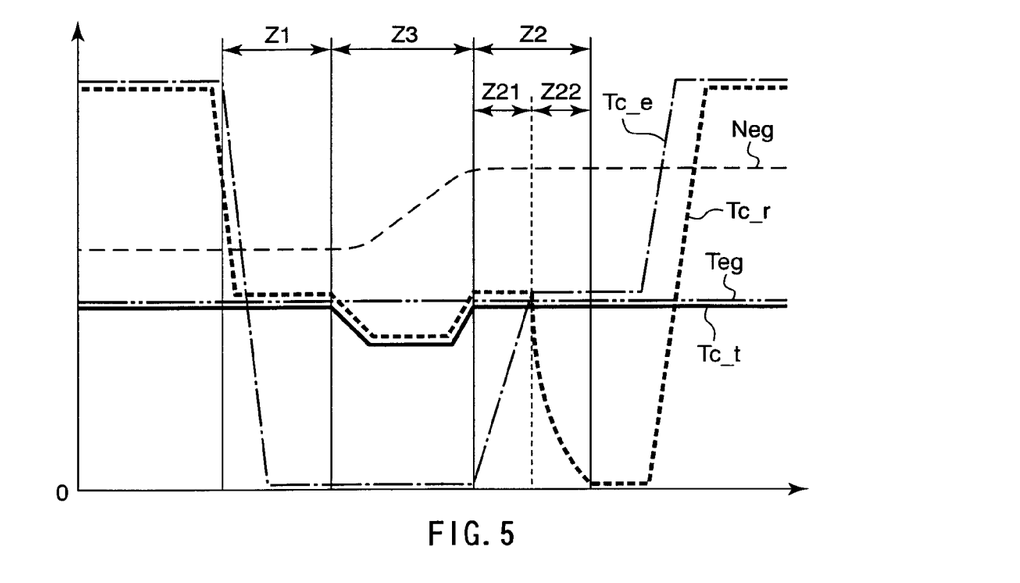
FIG. 5 is a time chart showing torque variation and rotation speed variation corresponding to clutch operation when a power-on down-shift is performed.
Figure 6:
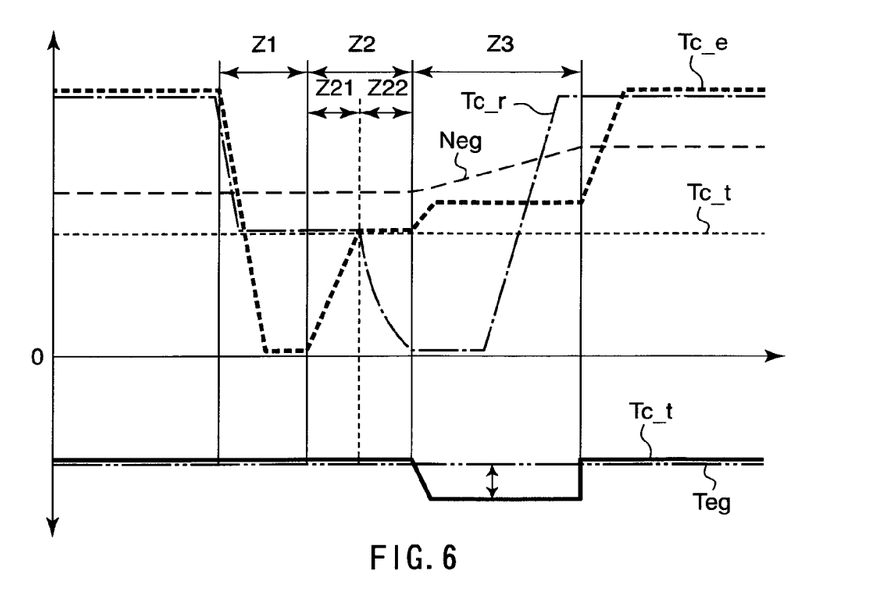
FIG. 6 is a time chart showing torque variation and rotation speed variation corresponding to clutch operation when a power-off down-shift is performed.
Figure 7:
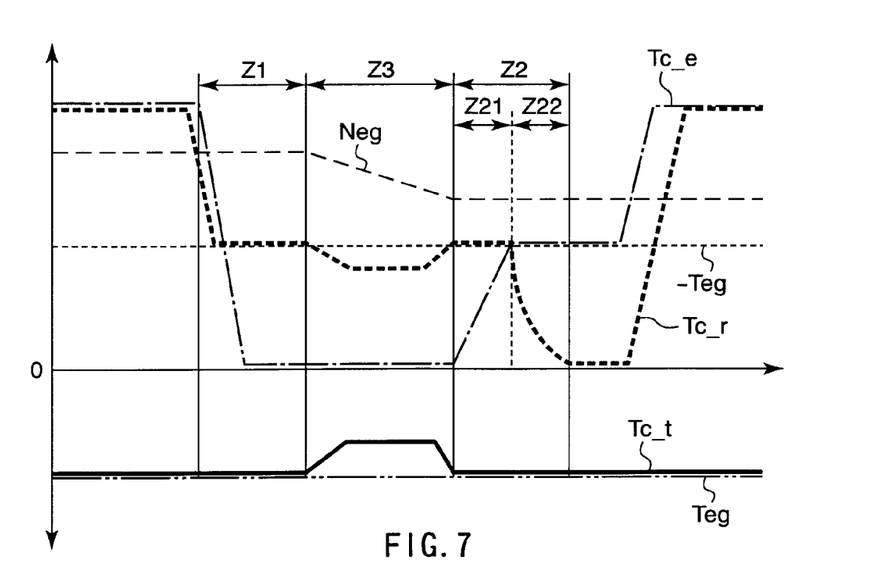
FIG. 7 is a time chart showing torque variation and rotation speed variation corresponding to clutch operation when a power-off up-shift is performed.

FIG. 4 is a time chart showing torque variation and rotation speed variation corresponding to clutch operation in the case of the first quadrant—that is, when a power-on up-shift is performed. FIG. 5 is a time chart showing torque variation and rotation speed variation corresponding to clutch operation in the case of the second quadrant—that is, when a power-on down-shift is performed. FIG. 6 is a time chart showing torque variation and rotation speed variation corresponding to clutch operation in the case of the third quadrant—that is, when a power-off down-shift is performed. FIG. 7 is a time chart showing torque variation and rotation speed variation corresponding to clutch operation in the case of the fourth quadrant—that is, when a power-off up-shift is performed.

In FIG. 4 through FIG. 7, Tc_r is the torque capacity of the release-side clutch, Tc_e is the torque capacity of the engagement-side clutch, Tc_t is the total transfer torque of both clutches, Neg is the engine rotation speed, −Teg and Teg are engine torque values, and, in particular, |Teg| is used in the case of the second quadrant (see FIG. 5) and the fourth quadrant (see FIG. 7) when engine torque is negative.

In FIG. 4 through FIG. 7, in the gear changing period in each of control modes 1 through 4, the torque transfer preparation phase is indicated by Z1, the torque transfer path change phase by Z2, and the inertia phase by Z3. In the gear changing period in each of the control modes shown in FIG. 4 through FIG. 7, transmission control unit 110 controls driving of first clutch 74 via first clutch actuator 77 and controls driving of second clutch 75 via second clutch actuator 78 based on input information. By controlling driving of first clutch 74 and second clutch in this way, transmission control unit 110 performs disengagement of the clutch currently performing torque transfer, and engagement of the clutch that will transfer torque to a gear pair after a shift, for each control mode. Below, the clutch that is currently being used and that is being changed over from is called the release-side clutch, and the clutch that transfers torque in an engaged state after a gear change is called the engagement-side clutch. In FIG. 4 through FIG. 7, portions of graphs that overlap horizontally on the same horizontal axis are shown slightly displaced for convenience. For example, in torque transfer path change phase Z2 in FIG. 4, portions of the Teg, Tc_r, and Tc_t graphs actually overlap.

In control mode 1 in which transmission control at the time of a power-on up-shift is performed as shown in FIG. 4, transmission control unit 110 first performs a torque transfer preparation operation in torque transfer preparation phase Z1.

That is to say, in control mode 1, in torque transfer preparation phase Z1 transmission control unit 110 controls whichever of first clutch 74 and second clutch 75 is the clutch currently transferring torque (also referred to as "release-side clutch"), and lowers release-side clutch torque capacity Tc_r without lowering the transfer torque (total clutch transfer torque Tc_t transferred to the main shafts via both clutches). Also, in torque transfer preparation phase Z1 in control mode 1, transmission control unit 110 also performs control to lower engagement-side clutch torque capacity Tc_e without lowering the transfer torque (total clutch transfer torque Tc_t transferred to the main shafts via both clutches) for the clutch that will perform torque transfer next (also referred to as "engagement-side clutch").

To be precise, in torque transfer preparation phase Z1, the engagement-side clutch is not transferring torque—that is, is in a state the engagement-side clutch is connected with a dog in the power transfer path of the engagement-side clutch disconnected. Therefore, in torque transfer preparation phase Z1, transmission control unit 110 controls the engagement-side clutch to disengage the connected engagement-side clutch, so that the next gear is engaged (to be precise, the dog is engaged) and moves to a preparatory position for changeover.

Also, in torque transfer preparation phase Z1 in control mode 1, transmission control unit 110 controls the release-side clutch, and lowers release-side clutch torque capacity Tc_r to the same torque as engine torque Teg.

Then, in torque transfer path change phase Z2, transmission control unit 110 operates the engagement-side clutch and raises engagement-side clutch torque capacity Tc_e from 0 to the target value (here, engine torque Teg) while maintaining release-side clutch torque capacity Tc_r at engine torque Teg.

Thus, in torque transfer path change phase Z2, transmission control unit 110 sets engagement-side clutch torque capacity Tc_e to the engine torque amount (Teg), and then operates and disconnects the release-side clutch—that is, lowers release-side clutch torque capacity Tc_r maintained at the engine torque amount (Teg) to 0.

The timing at which engagement-side clutch torque capacity Tc_e is set to engine torque Teg and the release-side clutch is operated here is, for example, halfway through the torque transfer path change phase.

That is to say, transmission control unit 110 raises engagement-side clutch torque capacity Tc_e to engine torque Teg in the first half of torque transfer path change phase Z2—for example, in half-interval Z21—as shown in FIG. 4.

Then transmission control unit 110 operates and disconnects the release-side clutch—that is, lowers release-side clutch torque capacity Tc_r from engine torque Teg to 0—in the second half of torque transfer path change phase Z2—for example, in half-interval Z22.

In this way, transmission control unit 110 performs sequential clutch changeover in torque transfer path change phase Z2, changing the torque transfer path in the transmission. Sequential clutch changeover operations in control mode 1 at the time of a power-on up-shift shown in FIG. 4 will now be described using FIG. 8.

Figure 8:
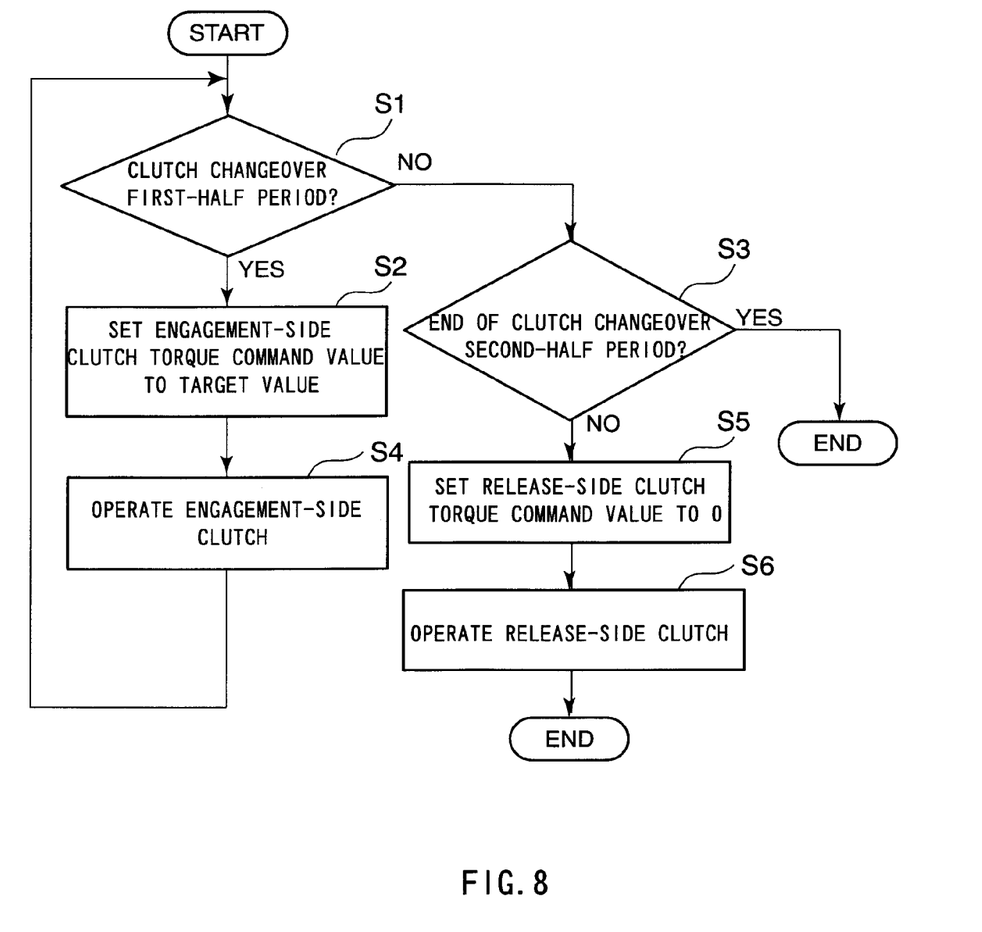
FIG. 8 is a flowchart for a casein which sequential clutch changeover operations are performed in a torque transfer path change phase.

FIG. 8 is a flowchart for a casein which sequential clutch changeover operations are performed in the torque transfer path change phase.

After positioning the engagement-side clutch at a changeover preparatory position in torque transfer preparation phase Z1, in step S1 transmission control unit 110 determines whether or not this is first-half-period Z21 of torque transfer path change phase Z2 based on clutch angle information indicating the clutch engagement state—that is, clutch torque capacity—input from a clutch angle sensor.

As shown in FIG. 4, clutch torque (clutch angle information) detected by the clutch angle sensor of the engagement-side clutch is input to transmission control unit 110 from either clutch angle sensor 102 or 103.

As shown in FIG. 4, transmission control unit 110 takes the period until the input clutch capacity (engagement-side clutch angle) reaches a target value to be half-interval Z21, and determines whether or not the clutch capacity has reached the target value.

If the clutch capacity is less than the target value in step S1, transmission control unit 110 determines that this is half-interval Z21, and proceeds to step S2.

On the other hand, if the clutch capacity has reached the target value in step S1, transmission control unit 110 determines that this is not half-interval Z21, and proceeds to step S3.

A determination by transmission control unit 110 that this is not half-interval Z21 indicates a determination that this is not first-half-period Z21 but second-half-period Z22 in torque transfer path change phase Z2.

In step S2, transmission control unit 110 sets an engagement-side clutch torque command value to a target value (here, Teg), then proceeds to step S4 and operates the engagement-side clutch. In step S4, transmission control unit 110 operates the engagement-side clutch so that the engagement-side clutch capacity becomes the target value (engine torque Teg).

In step S3, transmission control unit 110 determines whether or not second-half-period Z22 of torque transfer path change phase Z2 has ended.

If transmission control unit 110 determines in step S3 that second-half-period Z22 has not ended—that is, that second-half-period Z22 is partially complete—transmission control unit 110 proceeds to step S5. On the other hand, if transmission control unit 110 determines that second-half-period Z22 has ended, processing in torque transfer path change phase Z2—that is, actual changeover processing—is terminated.

Determination of termination during second-half-period Z22 in step S3—that is, determination of whether or not second-half-period Z22 is partially complete—is performed using information input to transmission control unit 110 from clutch angle sensors 102 and 103—here, the release-side clutch torque capacity.

That is to say, if a position has been reached in step S3 at which the release-side clutch torque capacity reaches the target value (here, 0), transmission control unit 110 determines this to be the end of second-half-period Z22 and terminates changeover processing, whereas if the predetermined target value (here, 0) has not been reached, transmission control unit 110 determines that second-half-period Z22 is partially completed and proceeds to step S5.

In step S5, transmission control unit 110 sets a release-side clutch torque command value to a target value (here, 0), and proceeds to step S6. In step S6, transmission control unit 110 operates the release-side clutch so that the target value is reached by outputting a torque command value. Here, since 0 is set as the clutch torque capacity target value, the release-side clutch is disconnected.

After performing processing in torque transfer path change phase Z2 in this way, transmission control unit 110 performs clutch operation in inertia phase Z3. In inertia phase Z3, transmission control unit 110 performs control that transfers power to drive shaft 730 via the engagement-side clutch in an engaged state, and engagement-side clutch torque capacity Tc_e in this phase is set to engine torque Teg or higher.

Also, in inertia phase Z3, while the release-side clutch is disengaged transmission control unit 110 drives shift mechanism 701, disconnects the dog of the transfer path that includes the release-side clutch and sets a neutral (idling) state, and then engages the release-side clutch. In this inertia phase Z3, the engine rotation speed is synchronized with the transfer path rotation speed via the engagement-side clutch.

For example, when an up-shift is performed from first gear to second gear in a power-on state, inertia phase Z3 is a period until the engine rotation speed is synchronized with the second gear side, and regardless of the first gear clutch (second clutch 75 as the engagement-side clutch), engine rotation speed Neg decreases as a result of torque capacity Tc_e of the second-gear-side clutch (second clutch 75 as the engagement-side clutch) being set to engine torque Teg or higher.

Inertia torque is generated by this variation in engine rotation speed Neg, and in this state the dog on the first gear side transferring driving force in the release-side clutch transfer path is disconnected and release-side clutch torque capacity Tc_r is set to neutral, and then the clutch is engaged. This operation differs according to the transmission system, and with a pre-shift system, for example, the dog that transfers torque to the next-gear gear pair is engaged first, and a clutch capable of transferring torque to the next-gear gear pair is disconnected and put into a standby state.

In control mode 2 in which transmission control at the time of a power-on down-shift is performed as shown in FIG. 5, control is performed with torque transfer path change phase Z2 and inertia phase Z3 switched around as compared with control mode 1.

First, transmission control unit 110 first performs a torque transfer preparation operation in torque transfer preparation phase Z1. Clutch (first clutch 74 and second clutch 75) control by transmission control unit 110 in this torque transfer preparation phase Z1 is similar to the operation in torque transfer preparation phase Z1 of control mode 1, and therefore a description thereof is omitted here.

Then transmission control unit 110 performs clutch control, and in inertia phase Z3 transfers power via the release-side clutch in an engaged state, lowers release-side clutch torque capacity Tc_r from engine torque amount Teg (|Teg|), and raises engine rotation speed Neg so as to reach the next-gear rotation speed.

On the other hand, the engagement-side clutch is put into a 0 clutch torque capacity state—that is, a neutral state (idling state)—by transmission control unit 110.

Then, in torque transfer path change phase Z2, which is the phase following inertia phase Z3 in control mode 2, transmission control unit 110 operates the engagement-side clutch and raises engagement-side clutch torque capacity Tc_e from 0 to engine torque Teg while maintaining release-side clutch torque capacity Tc_r at engine torque Teg.

In this torque transfer path change phase Z2, transmission control unit 110 sets engagement-side clutch torque capacity Tc_e to engine torque Teg (|Teg|), and then operates and disconnects the release-side clutch—that is, lowers release-side clutch torque capacity Tc_r maintained at engine torque Teg (|Teg|) to 0.

The timing at which engagement-side clutch torque capacity Tc_e is set to engine torque Teg (|Teg|) and the release-side clutch is operated here is, for example, halfway through the torque transfer path change phase.

That is to say, transmission control unit 110 raises engagement-side clutch torque capacity Tc_e to the engine torque amount (Teg) in first-half-interval Z21 in torque transfer path change phase Z2 as shown in FIG. 5.

Then transmission control unit 110 disconnects the release-side clutch—that is, lowers release-side clutch torque capacity Tc_r from engine torque Teg to 0—in second-half-interval Z22 in torque transfer path change phase Z2. In this way, transmission control unit 110 performs sequential clutch changeover in torque transfer path change phase Z2, changing the torque transfer path in transmission 70.

As shown in FIG. 6, in control mode 3 in which transmission control at the time of a power-off down-shift is performed, after performing sequence clutch changeover in the torque transfer path change phase, as in control mode 1, transmission control unit 110 performs clutch control so that torque is transferred in an engaged state in the inertia phase.

In control mode 4 in which transmission control at the time of a power-off up-shift is performed as shown in FIG. 7, clutch control is performed in the same way as in control mode 2. That is to say, in control mode 4, control corresponding to each phase is performed with torque transfer path change phase Z2 and inertia phase Z3 switched around as compared with control mode 3.

Thus, in each of transmission control modes 1 through 4 corresponding to commands from the driver while the vehicle is running, transmission control unit 110 performs a clutch changeover and changes the power transfer path without operating the clutches simultaneously. As a result, the clutch torque of one clutch can be maintained at engine torque |Teg| in transmission 70 during the clutch changeover—that is, in the torque transfer path change phase. Therefore, at the time of a torque transfer path change phase clutch changeover, the engine rotation speed does not vary as long as the clutch torque capacity of an operated clutch is in the range 0 to engine torque |Teg|.

In transmission control of a conventional multiple clutch transmission mounted in an automobile or the like, a clutch changeover is performed in the torque transfer path change phase by simultaneously operating both the release-side clutch and the engagement-side clutch.

If control that changes over clutches simultaneously is used for a motor cycle, the operation timings of both clutches may not synchronize since it is difficult to perform with precision instantaneous symmetrical operation of two clutches having individual variability via clutch actuators having individual variability.

For example, at the time of a clutch changeover, torque decreases faster for the release-side clutch than the engagement-side clutch. That is to say, at the time of a clutch changeover in torque transfer path change phase Z2, the total clutch torque falls below engine torque |Teg|, and the engine blows—that is, the engine rotation speed increases. This kind of engine blow due to simultaneous changeover is prone to occur in an automobile that has a larger engine rotating mass, and is heavier than, a motor cycle.

FIGS. 9A-9D are time charts showing torque variation and rotation speed variation corresponding to clutch operations when torque decreases faster for the release-side clutch than the engagement-side clutch in conventional transmission control that simultaneously changes over two clutches. FIG. 9A through FIG. 9D correspond respectively to the quadrant time charts in FIG. 4 through FIG. 7 of this preferred embodiment, FIG. 9A being a time chart corresponding to the first quadrant in FIG. 4, FIG. 9B a time chart corresponding to the second quadrant in FIG. 5, FIG. 9C a time chart corresponding to the third quadrant in FIG. 6, and FIG. 9D a time chart corresponding to the fourth quadrant in FIG. 7. FIGS. 9A-9D show release-side clutch torque capacity Tc_r, engagement-side clutch torque capacity Tc_e, total clutch transfer torque of both clutches Tc_t, engine rotation speed Neg, engine torque |Teg|, torque transfer preparation phase Z1, torque transfer path change phase Z2, and inertia phase Z3. As in FIG. 4 through FIG. 7, in FIGS. 9A-9D, a plurality of graphs in overlapping positions are shown slightly displaced for convenience. For example, in FIG. 9A, portions in which |Teg| and Tc_t in periods other than gear changing periods (Z1 through Z3) and Tc_r and Tc_e in periods other than gear changing periods (Z1 through Z3) are shown as displaced indicate overlapping identical values.

Figure 9A:
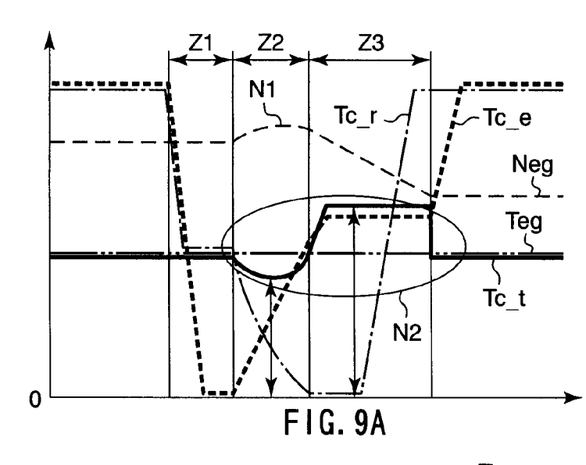
FIGS. 9A-9D show time charts showing torque variation and rotation speed variation corresponding to clutch operations in conventional transmission control that simultaneously changes over two clutches.

To describe the case of a power-on shift-up operation as an example, using the time chart corresponding to the first quadrant in FIG. 9A, energy equivalent to amount of blow (increase) N1 above the normal rotation speed in engine rotation speed Neg in torque transfer path change phase Z2 must be consumed in following inertia phase Z3 to prevent the occurrence of engine shock. With a simultaneous clutch changeover operation whereby the release-side clutch and the engagement-side clutch are operated simultaneously, performed in the normal inertia phase Z3 period, the energy of the amount of blow (increase) cannot be consumed (indicated by N2), and engine shock occurs.

Consequently, if simultaneous clutch engagement control is used for a motor cycle, it is necessary to perform continuous torque control with precision so that the total torque on the clutch side that changes in first clutch 74 and second clutch 75 infallibly reaches the engine torque amount (Teg) in the clutch portion. If such precise control is not performed, it is necessary to extend inertia phase Z3 and lower the engine rotation speed—that is, to extend the gear changing time.

Figure 9B:
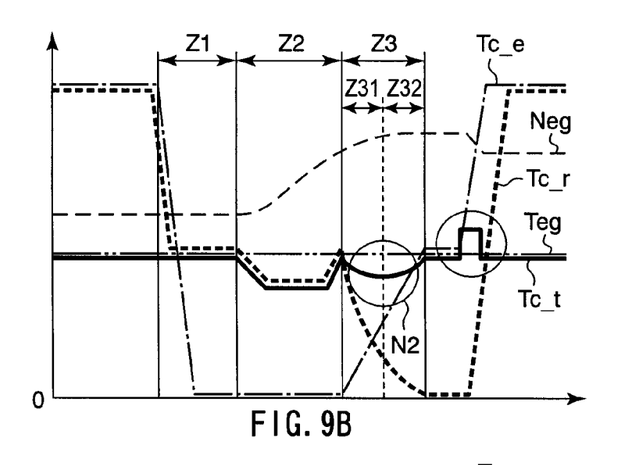
Figure 9C:
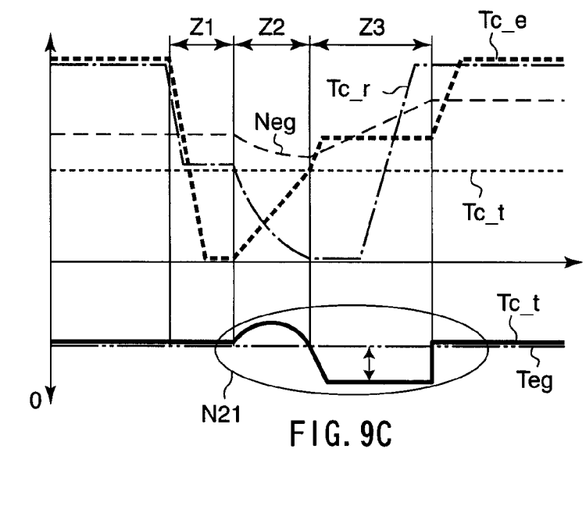
Figure 9D:
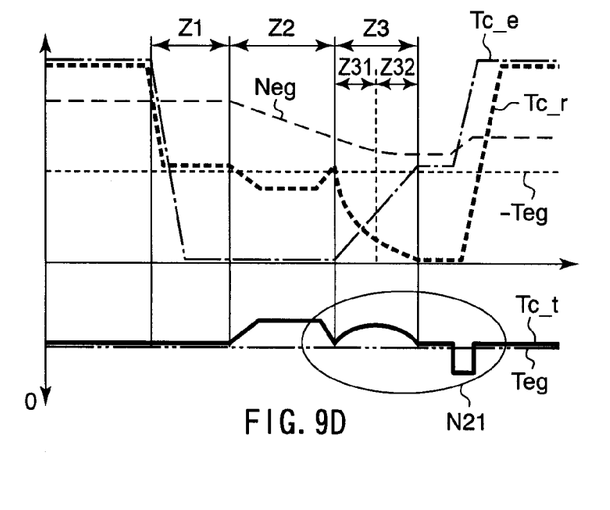

This also occurs in a similar way when a power-on downshift corresponding to the second quadrant is performed as shown in FIG. 9B. Also, in a power-off state such as shown in FIG. 9C and FIG. 9D, if, of the clutches that should be operated at the same timing, torque decreases faster for the release-side clutch than the engagement-side clutch, total clutch torque Tc_t falls (N21), and the engine rotation speed decreases sharply. To prevent this, it is necessary to control both clutches precisely, or to extend inertia phase Z3 and gently reduce the engine rotation speed—that is, to extend the gear changing time.

In contrast to this, with a transmitting apparatus of this preferred embodiment, unlike a conventional simultaneous clutch changeover, a clutch changeover is performed by sequential clutch operations in torque transfer path change phase Z2. Consequently, the total clutch torque does not fall below engine torque Teg, and the engine (EG) rotation speed does not rise or fall excessively. Also, in a clutch switchover, engine blow in proportion to the amount by which the torque of one clutch exceeds engine torque Teg does not occur.

That is to say, as shown in FIG. 4 through FIG. 7, with sequential clutch changeover control according to this preferred embodiment of the present invention, in torque transfer path change phase Z2 engagement-side clutch torque capacity Tc_e is first changed quickly to a target value (here, clutch part engine torque |Teg|), and immediately thereafter release-side clutch torque capacity Tc_r is quickly made a torque capacity of 0 Nm, for example.

As result of this control, with regard to torque transferred to drive shaft 730, a change is made from the release-side clutch already at a value of |Teg| to the engagement-side clutch due to a rise in the engagement clutch torque capacity during first-half-period Z21 in torque transfer path change phase Z2. Also, at some time during second-half-period Z22, the engagement-side clutch at Teg takes over.

Therefore, the torque of whichever of first clutch 74 and second clutch 75 has been changed by transmission control unit 110 control does not exceed clutch element engine torque (engine torque transferred to the clutch) Teg, and so does not affect torque transferred to drive shaft 730. As a result, the total clutch torque of first clutch 74 and second clutch 75 at the time of a changeover via transmission control unit 110 control is dependably controlled at the target value. Therefore, shock at the time of a gear change is reduced.

Thus, in this preferred embodiment, a sequential clutch changeover is performed by quickly changing the torque capacity to a target value for each clutch operating sequentially in torque transfer path change phase Z2. Consequently, with regard to the speed of gear changing, also, in this preferred embodiment gear changing can be performed within a time equal to torque transfer path change phase Z2 of conventional control that changes the torque of both clutches in a cross-coupled fashion by operating the release-side clutch and engagement-side clutch simultaneously (see FIGS. 9A-9D). Therefore, the gear changing time is no longer than with conventional control (see FIGS. 9A-9D).

A multiple clutch transmission control apparatus according to the present invention is not limited to the above preferred embodiments, and may be implemented with various modifications.

A case has here been described by way of example in which the present invention is configured as hardware, but it is also possible for the present invention to be implemented by software. For example, the same kind of functions as those of a multiple clutch transmission control apparatus according to the present invention can be realized by writing an algorithm of a multiple clutch transmission control method according to the present invention in a programming language, storing this program in memory, and having it executed by a control unit of a motor cycle in which a multiple clutch transmission is mounted.

Transmission control unit 110 used in the description of the above preferred embodiment is typically implemented using an LSI, which is an integrated circuit, or the like. The functions of transmission control unit 110 may be implemented individually as single chips, or a single chip may incorporate some or all of them. Here, the term LSI has been used, but the terms IC, system LSI, super LSI, and ultra LSI may also be used according to differences in the degree of integration.

A multiple clutch transmission control apparatus and multiple clutch transmission control method according to various preferred embodiments of the present invention have an effect of enabling gear changing to be performed smoothly by improving clutch torque control precision, without reducing the speed of gear changing, in a vehicle having a multiple clutch transmission, and are useful for a transmission control apparatus in a motor cycle in which a twin clutch transmission is mounted.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A multiple clutch transmission control apparatus comprising:
    a first main shaft including odd-numbered transmission gears;
    a first clutch arranged to transfer or block engine torque to the first main shaft;
    a second main shaft including even-numbered transmission gears;
    a second clutch arranged to transfer or block the engine torque to the second main shaft;
    an output shaft including driven gears arranged to mesh with the odd-numbered transmission gears and the even-numbered transmission gears, the output shaft transferring rotation of the first main shaft or the second main shaft to a driving wheel; and
    a transmission control section arranged to switch from a previous gear to a next gear by changing a torque transfer path by controlling the first clutch and the second clutch in a clutch changeover period; wherein
    the transmission control section is arranged to decrease a clutch torque capacity of a previous-gear-side clutch from among the first clutch and the second clutch to a target value in a torque transfer preparation phase, and then change the torque transfer path in the clutch changeover period by increasing a clutch torque capacity of a next-gear-side clutch from among the other of the first clutch and the second clutch to the target value while maintaining the clutch torque capacity of the previous-gear-side clutch at the target value, and then decreasing the clutch torque capacity of the previous-gear-side clutch.

2. The multiple clutch transmission control apparatus according to claim 1, wherein the target value is an engine torque value.

3. The multiple clutch transmission control apparatus according to claim 2, wherein the transmission control section is arranged to control the first clutch and the second clutch in the clutch changeover period so that total torque capacity of clutch torque capacity of the next-gear-side clutch and clutch torque capacity of the previous-gear-side clutch is greater than or equal to the engine torque value.

4. The multiple clutch transmission control apparatus according to claim 1, wherein the transmission control section is arranged to increase the clutch torque capacity of the next-gear-side clutch to a target value in a period that is half of the clutch changeover period.

5. A motorcycle comprising the multiple clutch transmission control apparatus according to claim 1.

* * * * *